US007953635B2

(12) United States Patent  
Sasaki et al.

(10) Patent No.: US 7,953,635 B2  
(45) Date of Patent: May 31, 2011

(54) MERCHANDISE SALES DATA PROCESSING APPARATUS AND COMPUTER READABLE MEDIUM

(75) Inventors: Yasutsugu Sasaki, Kanagawa (JP); Mahina Nakamura, Tokyo (JP); Maki Sato, Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/343,730

(22) Filed: Dec. 24, 2008

(65) Prior Publication Data

US 2009/0171798 A1 Jul. 2, 2009

(30) Foreign Application Priority Data

Dec. 28, 2007 (JP) .................................. 2007-339984

(51) Int. Cl.  
*G06Q 20/00* (2006.01)  
*G06K 15/00* (2006.01)  
(52) U.S. Cl. ......................................... 705/17; 235/383  
(58) Field of Classification Search .................. None  
See application file for complete search history.

(56) References Cited

U.S. PATENT DOCUMENTS

| 6,208,325 | B1 * | 3/2001 | Reddy et al. ............... 345/658 |
| 7,501,950 | B2 | 3/2009 | Suzuki |
| 7,575,162 | B1 * | 8/2009 | Malchak et al. ............. 235/383 |
| 2006/0261161 | A1 * | 11/2006 | Murofushi et al. ........... 235/383 |

FOREIGN PATENT DOCUMENTS

| CN | 1985281 | 6/2007 |
| JP | 02-307196 | 12/1990 |
| JP | 05-108055 | 4/1993 |
| JP | 09-185771 | 7/1997 |
| JP | 2001-255988 | 9/2001 |
| JP | 2005-173769 | 6/2005 |
| JP | 2005-251209 | 9/2005 |
| JP | 2005-339353 | 12/2005 |
| JP | 2006-350806 | 12/2006 |
| JP | 2007-148723 | 6/2007 |
| JP | 2007-226320 | 9/2007 |

OTHER PUBLICATIONS

Japanese Office Action for 2007-339984 mailed on Dec. 22, 2009.  
Japanese Office Action for 2007-339984 mailed on April 13, 2010.  
Chinese Office Action dated Aug. 4, 2010 corresponding to U.S. Appl. No. 12/343,730, filed on Dec. 24, 2008.

* cited by examiner

*Primary Examiner* — F. Ryan Zeender  
*Assistant Examiner* — Faris Almatrahi  
(74) *Attorney, Agent, or Firm* — Turocy & Watson, LLP

(57) ABSTRACT

Articles are placed in a commodity placement area thereby to acquire figure images of the articles, based on stored data acquired from wireless tags respectively attached to the articles. The acquired image forms are developed and displayed in X-axis and Y-axis directions in a display area of a display. A commodity registration screen that enables the choice of each article by an operation at a touch panel, e.g., a registration method selection dialogue, a voice registration dialogue, selection candidates, etc. are displayed on the display.

6 Claims, 11 Drawing Sheets

MERCHANDISE SALES DATA PROCESSING APPARATUS AND COMPUTER READABLE MEDIUM

CROSS REFERENCE TO RELATED APPLICATION

The present application is based on and claims the benefit of priority of Japanese Patent Application P2007-339984 filed on 28 Dec. 2007, the entire contents of which are incorporated herein by reference.

BACKGROUND OF THE INVENTION

1. Field of the Invention

The present invention relates to a merchandise sales data processing apparatus for processing commodity sales data produced by face-to-face selling on a customer, and a computer readable medium therefor, and particularly to a technique for displaying transaction information.

2. Discussion of the Background

In recent years, various techniques have been proposed and put to practical use wherein wireless tags are attached to commodities or articles, data, e.g., commodity codes related to the articles with the wireless tags attached thereto are respectively stored in memories of the wireless tags, and a merchandise sales data process and commodity management are executed using the data. It has been expected that each of POS terminals employed in various stores such as a convenience store, a supermarket, a drug store, a large-scale suburban store, etc. collectively reads data such as commodity codes stored in memories of wireless tags respectively attached to articles stored or accommodated in a shopping basket thereby to enable an efficient checkout. An keen investigation has been advanced to such collective reading of the wireless tags attached to the plural articles and considered to come into wide use in the future. Incidentally, the collective reading of the wireless tags attached to the articles has been described in, for example, Japanese Unexamined Patent Publication No. 2007-226320.

Meanwhile, in the various stores described above, when data of commodity codes or the like stored in memories of wireless tags respectively attached to articles that a customer desires to purchase, are read, data about the names of corresponding articles, their unit prices and the like are retrieved based on the read commodity codes and displayed on a display as commodities or articles to be purchased. Generally, articles to be purchased are displayed on both a cashier display directed to the salesperson side and a customer display directed to the customer side. The display representation in this case is generally of a list representation or display (refer to, for example, FIG. 11 of Japanese Unexamined Patent Publication No. 2005-339353).

In the various stores described above, a customer generally brings articles to be purchased to a checkout counter in a state in which the articles are being stored in a shopping basket prepared by each store. A salesperson being a cashier visually identifies each article brought to the checkout counter that the customer desires to buy, for the first time at this time. In this case, it is needless to say that the articles that the customer desires to buy are of actual articles. On the other hand, a list of the purchased articles displayed on the display in list form by reading the commodity codes attached to the actual articles is represented by symbols of characters. Therefore, when one attempts to check the articles stored in the shopping basket and the articles displayed on the display in list form, there is a need to make contradistinction between the real world and the symbolized world.

Now, in such a checkout system that when commodity codes are read for every article, commodity information about the articles are added to and displayed on the list representation of the display, the actual articles and the symbolized articles displayed on the display in list representation are compared each time the articles are taken out from the shopping basket. Therefore, even when a plurality of articles are brought into check, the work of checking thereof is relatively easy. On the other hand, in such a checkout system that wireless tags respectively attached to plural articles are collectively read and commodity information about the individual articles are displayed in list representation at a time, such matching or checking work is not promoted easily. This is because since there is a need to compare the plural actual articles remaining stored in the shopping basket and the plural symbolized articles displayed on the display in list form, the number of articles to be intended for comparison will increase.

The technique of collectively reading the wireless tags attached to the plural commodities or articles has another problem that the tag of articles can not be read out collectively and becomes unregistered. Such a problem arises due to the relation of reading accuracy. Further, it occurs even where articles with no wireless tags attached thereto are being mixed. On the other hand, the technique of inputting the number of articles to be purchased by hand thereby to detect non-registered articles has been described in Japanese Unexamined Patent Publication No. 2007-226320. The technique of automatically detecting non-registered articles, based on measured data of weight has been described in Japanese Unexamined Patent Publication No. 2005-251209.

An object of the present invention is to facilitate the work of checking individual articles brought to a checkout counter and articles displayed on a display even where such a checkout system that wireless tags respectively attached to the articles brought to the checkout counter are collectively read out and commodity information about the individual articles are displayed at a time is adopted.

SUMMARY OF THE INVENTION

According to the present invention, a merchandise sales data processing apparatus is provided which includes: (i) a checkout counter having a commodity placement area for placing articles to be purchased, (ii) a display for displaying information, (iii) a touch panel placed in the display, (iv) a wireless communication unit that executes data communications with wireless tags for short-range wireless communications respectively attached to the articles placed in the commodity placement area and thereby acquires stored data from the wireless tags, and (v) a control unit that executes a merchandise sales data process containing a settlement process, based on commodity codes contained in the stored data acquired by the wireless communication unit and commodity codes of the articles each selected by an operation at the touch panel and executes display control of the display upon the merchandise sales data process. The control unit executes display control to display figure images of the articles acquired from a memory unit based on the stored data acquired by the wireless communication unit and a commodity registration screen that enables a selection of each article by the operation at the touch panel.

According to the present invention, there is provided a computer readable medium including a computer program code, the computer program code being installed in a computer of a merchandise sales data processing apparatus equipped with a checkout counter having a commodity placement area for placing articles to be purchased, a display for displaying information, a touch panel placed in the display, and a wireless communication unit that executes data communications with wireless tags for short-range wireless communications respectively attached to the articles placed in the commodity placement area and thereby acquires stored data from the wireless tags, and the computer being caused to execute a function for performing access to a memory unit storing a commodity image database that stores commodity codes and image data of figure images each visually representing the appearance of each article in association with one another thereby to acquire image data corresponding to the commodity codes contained in the stored data acquired by the wireless communication unit and developing the figure images based on the acquired image data in X-axis and Y-axis directions in a display area of the display thereby to display transaction images, a function for displaying on the display, a commodity registration screen that enables a selection of each article by the operation at the touch panel, and a function for executing a merchandise sales data process containing a settlement process, based on the commodity codes contained in the stored data acquired by the wireless communication unit and the commodity codes of the articles each selected by the operation at the touch panel.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Embodiments of the present invention will be explained with reference to the drawings.

One embodiment of the present invention will be explained based on FIGS. 1 through 9(A) and (B).

Figure 1:
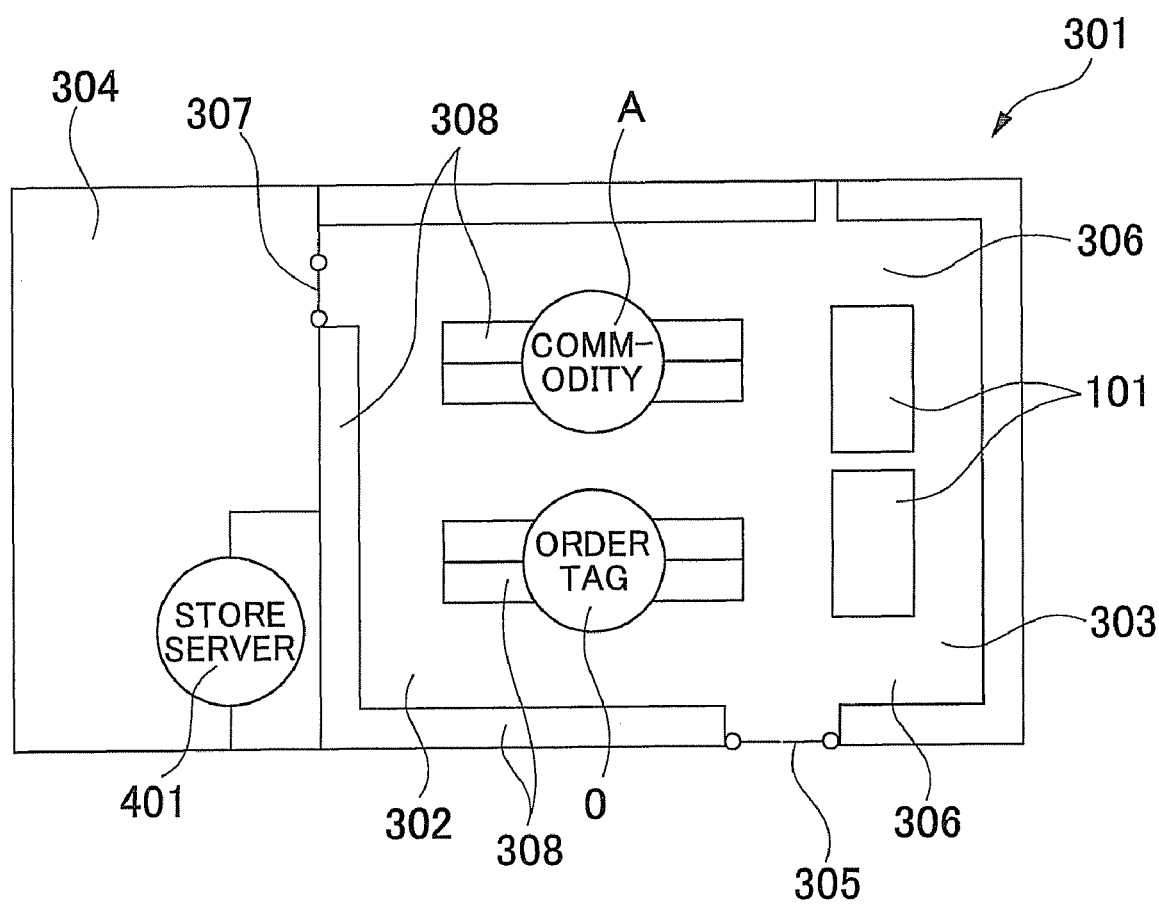
FIG. 1 is a typical diagram showing a store with a POS terminal (merchandise sales data processing apparatus) installed therein as one embodiment of the present invention.

A merchandise sales data processing apparatus according to the present embodiment is of an example applied to each of POS terminals 101 (refer to FIG. 1 or the like). Before the POS terminal 101 is explained in detail, a sales aspect in a store 301 (refer to FIG. 1 or the like) in which each POS terminal 101 is installed will be described.

FIG. 1 is a typical diagram showing the store 301 in which the POS terminals 101 are installed. The store 301 is divided into a sales yard 302, a checkout corner 303 and a backyard 304. When a customer opens an entrance door 305 of the store 301, the customer reaches the sales yard or floor 302 and can enter the checkout corner 303 from the sales yard 302 via a passage 306. The sales yard 302 and the checkout corner 303, and the backyard 304 are partitioned therebetween and openable by a door 307.

A plurality of commodity shelves 308 are disposed in the sales yard 302. Order tags 0 are displayed or laid out in the commodity shelves 308 in addition to actual commodities A.

The two POS terminals 101 are installed in the checkout corner 303.

A store server 401 is installed in the backyard 304.

Explanations are now added to the actual articles A and the order tags O. The actual articles A are of commodities or articles brought back as they are after the purchase thereof. The order tags O are represented with articles to be delivered after their purchase as tags. Namely, the articles placed on an article or commodity placement area 105 (refer to FIG. 2) to be described later are ones indicative of the actual articles A and the order tags O. Wireless tags (not shown) for short-range wireless communications are attached even to the actual articles A and the order tags O. Various commodity information about the articles represented by the articles A and the order tags O with the wireless tags attached thereto are stored and held in their corresponding memories of the wireless tags. Typical or representative commodity information is a commodity or article code for identifying the type of its article. In addition, identification codes for identifying the actual articles A and the order tags O are also stored and held in the corresponding memories of the wireless tags. An identification code for identifying or specifying the existence of each actual article is stored and held in the corresponding memory of the wireless tag attached to each actual article A, whereas an identification code for identifying the existence of each order tag is stored and retained in the corresponding memory of the wireless tag attached to each order tag O, respectively. The order tag O is shaped in card form or bar-like form by way of example. Any one may be adopted as the forms of the order tags O if forms displayable in the commodity shelves 308 are taken. It is however desired that the name of each article represented by the order tag O, its price and the like are displayed on the order tag O by print or the like.

Figure 2:
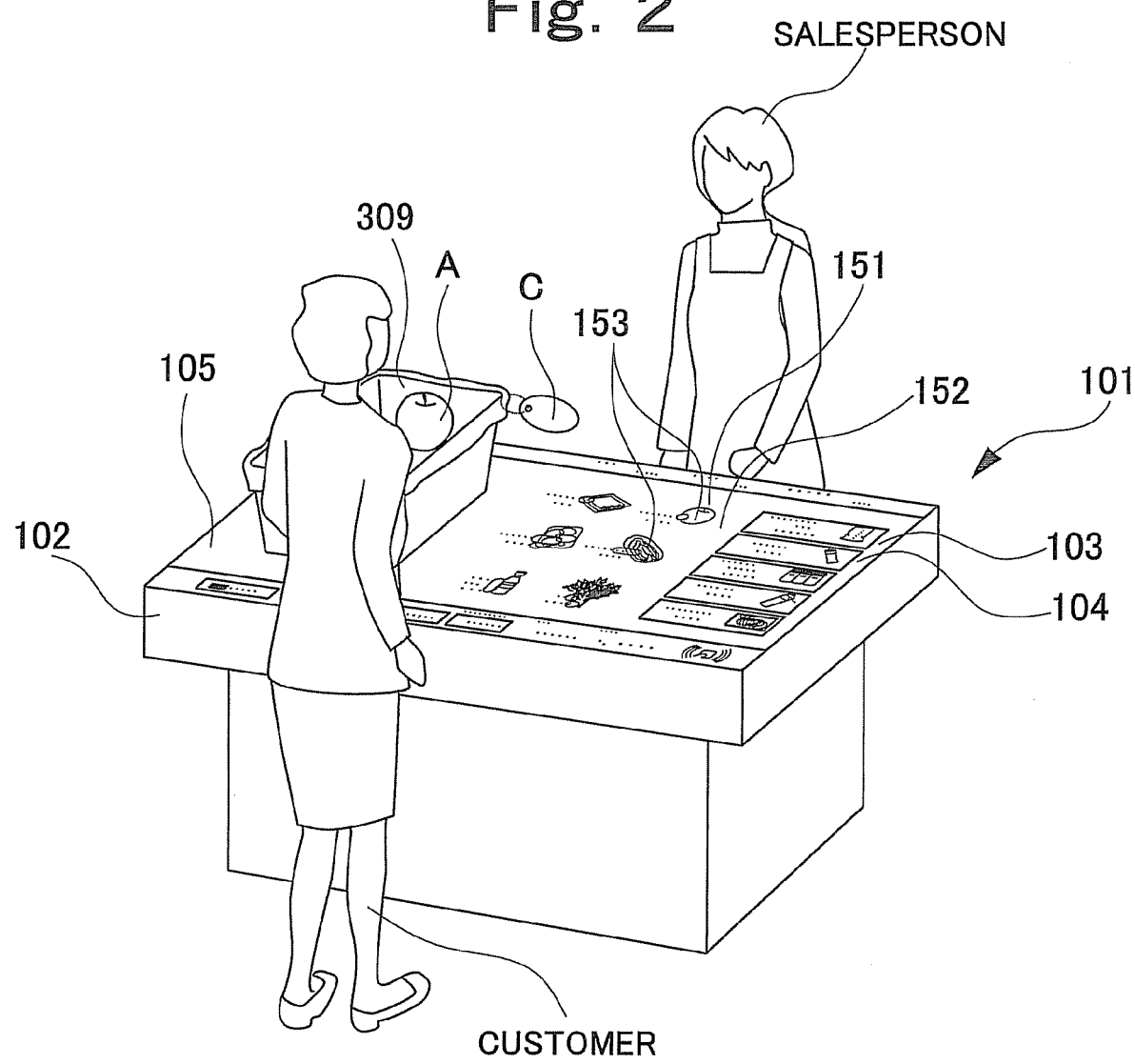
FIG. 2 is a perspective view showing the POS terminal (merchandise sales data processing apparatus) being in face-to-face selling, as one embodiment of the present invention.
Figure 4:
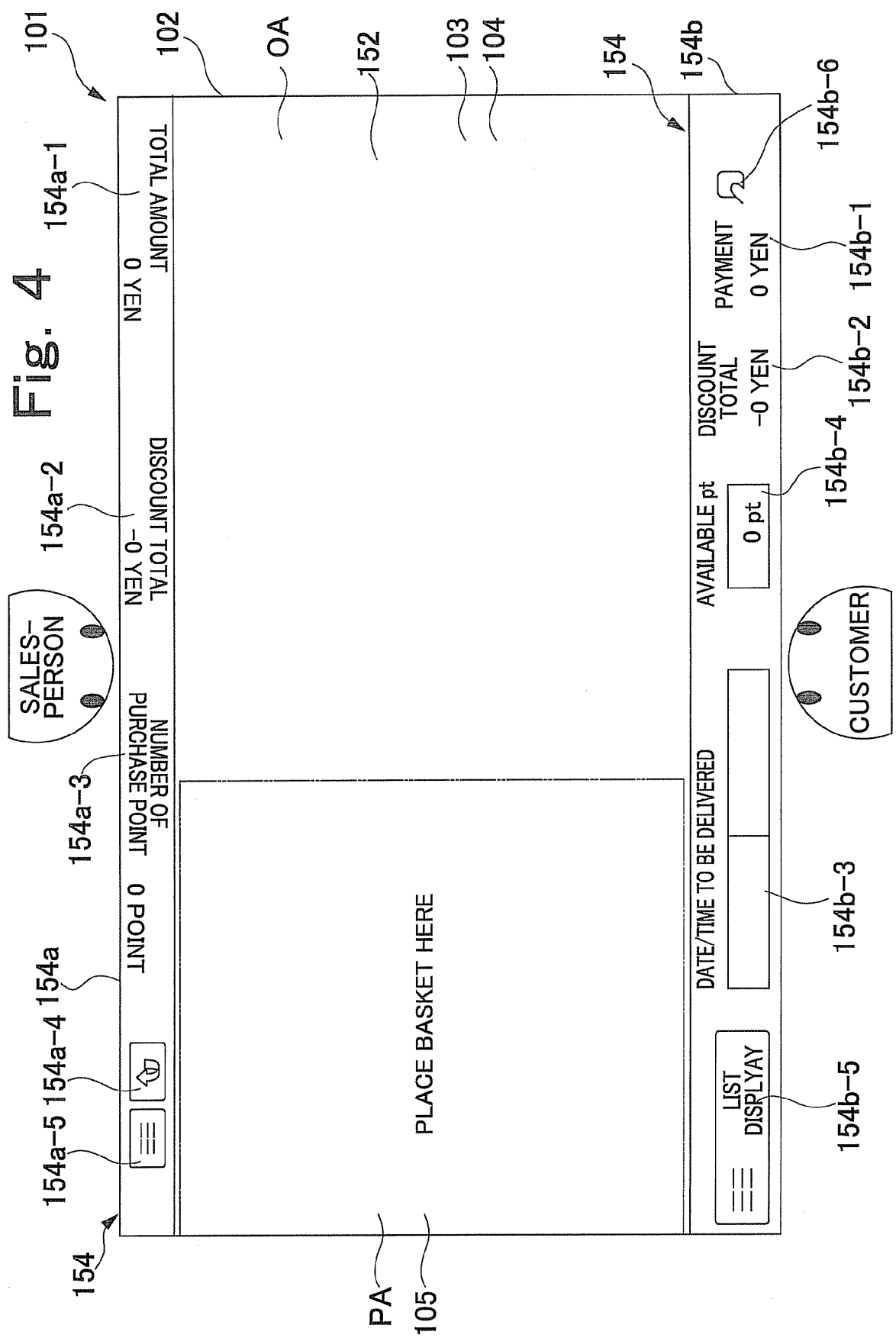
FIG. 4 is a plan view of the POS terminal (merchandise sales data processing apparatus) showing a state in which a sales standby screen is being displayed on a display.

FIG. 2 is a perspective view showing the POS terminal 101 being in face-to-face selling. The POS terminal 101 includes a checkout counter 102 as its constituent element and is configured integrally with the checkout counter 102. The checkout counter 102 includes a display 103 for displaying information, which is provided in a partial area of its top-plate surface. A liquid crystal display, a plasma display or the like can be used as the display 103. A touch panel 104 is disposed in such a display 103 in laminated form. At the top-plate surface of the checkout counter 102, another partial area unprovided with the display 103 and the touch panel 104 takes the commodity placement area 105 for placing articles to be purchased. The distinction between the area of placement of the display 103 and the touch panel 104 at the top-plate surface of the checkout counter 102 and the commodity placement area 105 is as shown in FIG. 4. In FIG. 4, the placement area of the display 103 and the touch panel 104 is represented as OA and the commodity placement area 105 is represented as PA for the sake of convenience.

Figure 3:
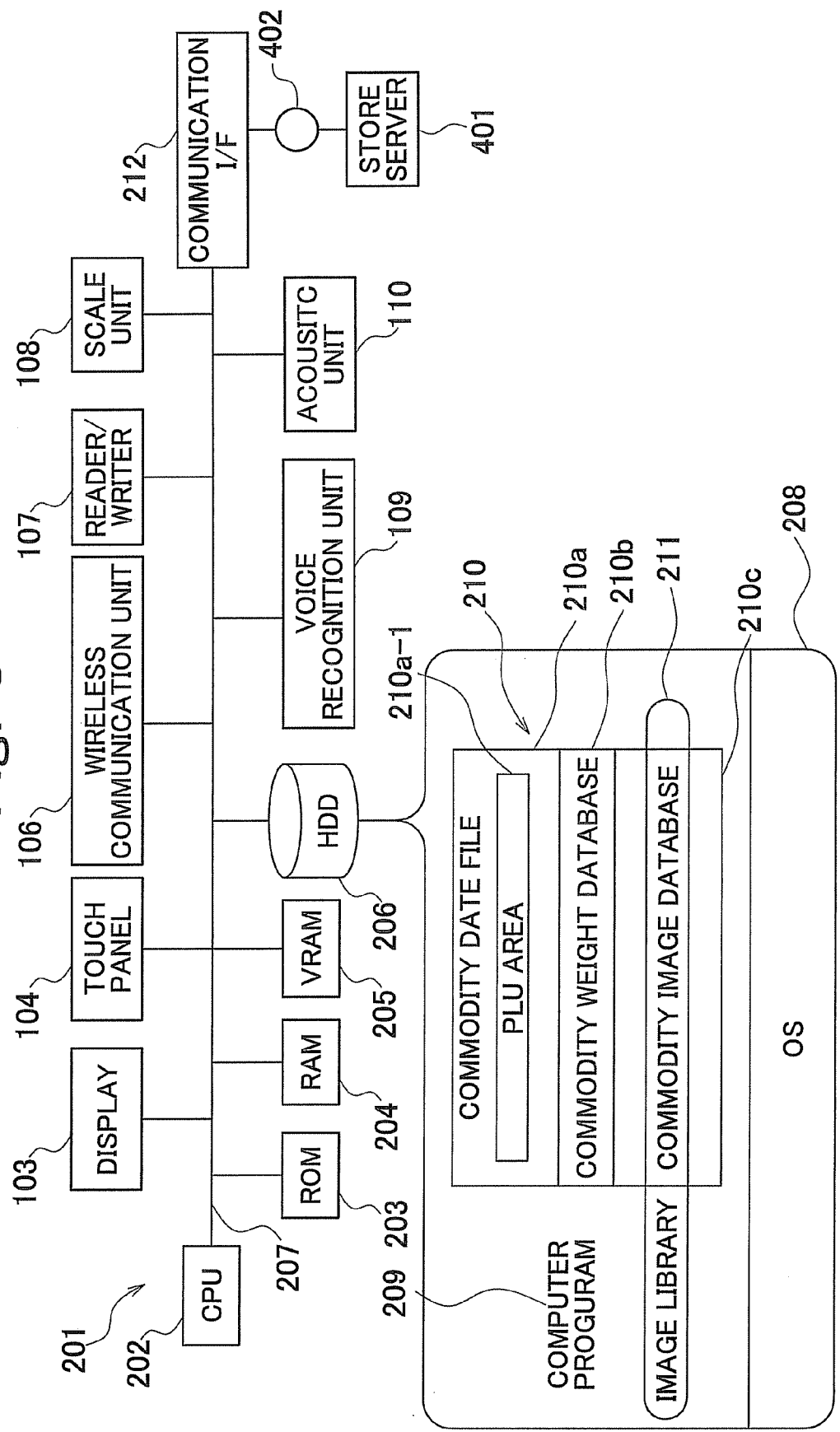
FIG. 3 is a block diagram illustrating a hardware configuration of the POS terminal (merchandise sales data processing apparatus)

A short-range wireless communication unit 106, a reader/writer 107, a scale unit 108, a voice or speech recognition unit 109 and a sound or acoustic unit 110 are built in the checkout counter 102 (any refers to FIG. 3).

The wireless communication unit 106 performs data communications with each wireless tag for the short-range wireless communication attached to each article placed in the commodity placement area 105 and acquires its stored data from the wireless tag. Namely, the wireless communication unit 106 uses an antenna (not shown) embedded in the commodity placement area 105 and executes data communications with the corresponding wireless tag using an RFID (Radio Frequency Identification) technique. Objects targeted for the short-range wireless communications by the wireless communication unit 106 are typically of wireless tags attached to the actual articles A and the order tags O respectively. In addition, the wireless communication unit 106 performs short-range wireless communications even with a wireless tag built in a membership card C possessed by a customer. In this case, the membership card C is in a state of being attached to a shopping basket 309 that accommodates or holds the articles A and order tags O placed in the commodity placement area 105.

The reader/writer 107 communicates with a non-contact IC chip that enables settlement by the RFID technique. As the IC chip, there is used, as an example, one having such a data structure that electronic money having a value equivalent to cash is stored and held therein. As another embodiment, the IC chip may be one of a debit type which stores and holds an identification number for identifying a withdrawal bank account and is used upon settlement. In any case, the IC chip is embedded in, for example, a card or built in a cellular phone.

The scale unit 108 is configured by a load cell scale as one example and measures the weight of each article placed in the commodity placement area 105 placed in the top-plate surface of the checkout counter 102.

As shown in FIG. 2, the POS terminal 101 according to the present embodiment is configured in such a manner that the selling of commodities is carried out in a state in which a salesperson corresponding to a cashier and a customer are face to face with each other with the checkout counter 102 interposed therebetween. At this time, the POS terminal 101 displays a transaction screen 151 containing transaction information such as articles to be purchased by the customer, their unit prices, the total amount thereof and the like on the display 103. The display 103 is disposed upwards on the top-plate surface of the checkout counter 102 as described above. Thus, the POS terminal 101 displays the transaction information at a specific position taken as the top-plate surface of the checkout counter 102 that both the salesperson and customer can identify visually. Then, both the salesperson and customer touch-operates the touch panel 104 as needed thereby to make it possible to change a display state displayed on the display 103 and input specific instructions.

The POS terminal 101 first displays a background image 152 taken on the basis of a transaction screen 151 on the display 103. If a shopping basket 309 in which articles A and order tags O have been stored is placed in its corresponding commodity placement area 105 of the checkout counter 102, then the POS terminal 101 develops and displays on the background image 152, figure images 153 of articles acquired from a commodity image database 210c (refer to FIG. 3) to be described later based on data stored in wireless tags (not shown) attached to the articles A and order tags O acquired by the wireless communication unit 106. At this time, the articles developed and displayed on the background image 152 are of all articles corresponding to the stored data read from the wireless tags as displayable as one screen.

FIG. 3 is a block diagram showing a hardware configuration of the POS terminal 101. As described above, the POS terminal 101 executes the information display process for the display 103 and the information input process from the touch panel 104 and executes the data reception processes from the wireless communication unit 106 for executing the short-range wireless communications with each wireless tag, the reader/writer 107 for executing the process for the transmission/reception of data to and from the non-contact IC chip that enables settlement and the scale unit 108. Further, the POS terminal 101 executes a merchandise sales data process containing a settlement process. Such various processes are carried out by a controller or control unit 201. The control unit 201 may be one of a semiconductor chip configuration in which an operation sequence has been written or one of a microcomputer configuration operated with a program being stored in a memory. The control unit 201 of the microcomputer configuration will be introduced here.

A CPU 202 serves as the backbone for the control unit 201. A ROM 203 that fixedly stores fixed data, a RAM 204 that stores variable data rewritably, a VRAM 205 that generates a display image displayed on the display 103, and an HDD 206 are connected to the CPU 202 via a system bus 207. An OS 208 (Operating System), a computer program 209 for merchandise sales data processing, a commodity database 210 and an image library 211 are stored in the HDD 206. All or part of these OS 208, computer program 209, commodity database 210 and image library 211 are transferred to and used in the RAM 204 upon start-up of the POS terminal 101. The commodity database 210 and the image library 211 will be explained below.

The commodity database 210 is of a database that stores information about various articles handled by the store 301 and contains a commodity data file 210a, a commodity weight database 210b and a commodity image database 210c.

The commodity data file 210a has a PLU area 210a-1.

The PLU area 210a-1 stores unit prices of individual articles and set discount information in association with commodity codes for identifying the individual articles. The set discount information contains a condition for establishing each set discount, and information about the discount where the set discount is established. As the set discounts, there are provided a mix and match (M&M) established where different articles are purchased as a set, and a plurality of purchase discounts established where the same article is purchased by a given number. As the condition for establishing the set discount, information as to whether the mix and match (M&M) is applied for each individual commodity code, and commodity codes of other articles for establishing the mix and match (M&M) are stored in the PLU area 210a-1. As the condition for establishing the set discount, information as to whether the plural purchase discounts are applied for each individual commodity code, and information about the number of pieces where the plural purchase discounts are established are stored in the PLU area 210a-1. As the information about the discount where the set discount is established, a discount amount, a discount rate, a unit price subsequent to the discount, a price subsequent to the discount of the overall commodity where the set discount is established, etc. are stored in the PLU area 210a-1.

Then, the commodity weight database 210b stores the weights of individual articles therein in association with commodity codes for specifying the individual articles. Each of the weights is stored as a single or unitary weight value as one example. As another example, the weight is stored as an upper limit value and/or a lower limit value to be allowed for the unitary weight value. As a further example, a given weight value range is stored.

Then, the commodity image database 210c stores image data about individual articles therein in association with their corresponding commodity codes for specifying the individual articles. The image data are of image data about figure images 153 (refer to FIGS. 7 and 8 and the like) which visually represent the forms of the articles. As such image data, there are used, for example, a two-dimensional illustration in which the external appearance of each article is represented realistically or impressively, a three-dimensional illustration, a picture photographed by a digital camera, etc.

The image library 211 comprises various image data and a frame image necessary upon execution of the computer program 209. Accordingly, the commodity image database 210c forms part of the image library 211.

The display 103, touch panel 104, wireless communication unit 106, reader/writer 107, and scale unit 108 are connected to the control unit 201 via a controller and an interface (both not shown) for their devices connected to the system bus 207. Thus, the display 103, touch panel 104, wireless communication unit 106, reader/writer 107, and scale unit 108 are placed under the control of the control unit 201.

The control unit 201 is connected even to a communication interface 212 via the system bus 207. The communication interface 212 is connected to, for example, a local area network 402 and realizes data communications between various external devices such as the externally-installed store server 401 and the controller 201.

FIG. 4 is a plan view of the POS terminal 101 showing a state in which a sales standby screen is displayed on the display 103. In FIG. 4 as mentioned above, the placement or layout area of the display 103 and the touch panel 104 is represented as OA and the commodity placement or layout area 105 is represented as PA for the sake of convenience. An instruction for a customer that "Place basket here" is represented in the commodity placement area 105 represented as PA by print or the like.

The control unit 201 display-controls the display 103 thereby to display a background image 152 in the placement area OA of the display 103 and the touch panel 104. The background image 152 is generated based on image data contained in the image library 211 installed in the HDD 206 and copied to the RAM 204. The image data basic to the background image 152 are of a two-dimensional illustration and a three-dimensional illustration.

The control unit 201 display-controls the display 103 thereby to represent transaction information display columns 154 in the placement area OA of the display 103 and the touch panel 104. A transaction information display column 154a for a salesperson, which is directed to the salesperson side corresponding to a cashier, and a transaction information display column 154b for a customer, which is directed to the customer side, are prepared for the transaction information display columns 154. The transaction information display column 154a for the salesperson includes a total amount column 154a-1, a discount amount column 154a-2 and a number-of-purchase points column 154a-3. Further, the transaction information display column 154a includes a reverse display instruction button 154a-4 and a list display instruction button 154a-5. The transaction information display column 154b for the customer includes a payment amount column 154b-1, a discount amount column 154b-2, a delivery date/time designation column 154b-3 and a point designation column 154b-4. Further, the transaction information display column 154b includes a list display instruction button 154b-5 and a hold-over position display 154b-6.

The total amount column 154a-1 and the payment amount column 154b-1 are of columns for displaying or indicating a total amount of articles that a customer will buy.

The discount amount column 154a-2 and the discount amount column 154b-2 are of columns for displaying a discount amount.

The number-of-purchase points column 154a-3 is of a column for displaying the number of purchase points displayed only on the transaction information display column 154 for the salesperson.

The reverse display instruction button 154a-4 is an object for instructing the reversal or inversion of the display content of the background image 152 displayed only on the transaction information display column 154a for the salesperson. The reversal mentioned herein means that the orientation of the display contents of the background image 152 is switched to the salesperson side and the customer side.

The list display instruction button 154a-5 and the list display instruction button 154b-5 are of objects for instructing the list display of the articles on the background image 152. As the list display in this case, figure images of articles acquired from the commodity image database 210c (refer to FIG. 3) are displayed as shown in a list display screen.

The delivery date/time designation column 154b-3 is of an object displayed only in the transaction information display column 154b for the customer and for changing and instructing the delivery date/time displayed in default form through a touch operation on the touch panel 104. In this case, the delivery date/time displayed in default form is set based on information stored at data stored in a wireless tag built in a membership card C attached to the shopping basket 309 held by the customer. When "A.M. 9:00-A.M. 11:00 on the date following the settlement day" is stored as the stored data of the wireless tag as one example, "Next day, 9:00-11:00" is expressed in default form in the delivery date/time designation column 154b-3.

The point designation column 154b-4 is of an object displayed only in the transaction information display column 154b for the customer. The number of storage points for the customer and the available number of points thereof are displayed therein. The number of storage points is set based on the information stored at the data stored in the wireless tag built in the membership card C attached to the shopping basket 309 held by the customer. The available number of points becomes 0 in default setting and is changeable/designable by the touch operation of the touch panel 104.

The hold-over position display 154b-6 is displayed only in the transaction information display column 154b for the customer and indicates a hold-over position of a medium that incorporates the non-contact IC chip that enables settlement therein. Such a medium is built in the card, cellular phone or the like as mentioned above. Thus, since the hold-over position display 154b-6 indicates the position over which the non-contact IC chip built in the card or cellular phone or the like is held, an antenna (not shown) of the reader/writer 107 (refer to FIG. 3) is positioned below the hold-over position display 154b-6.

Figure 5:
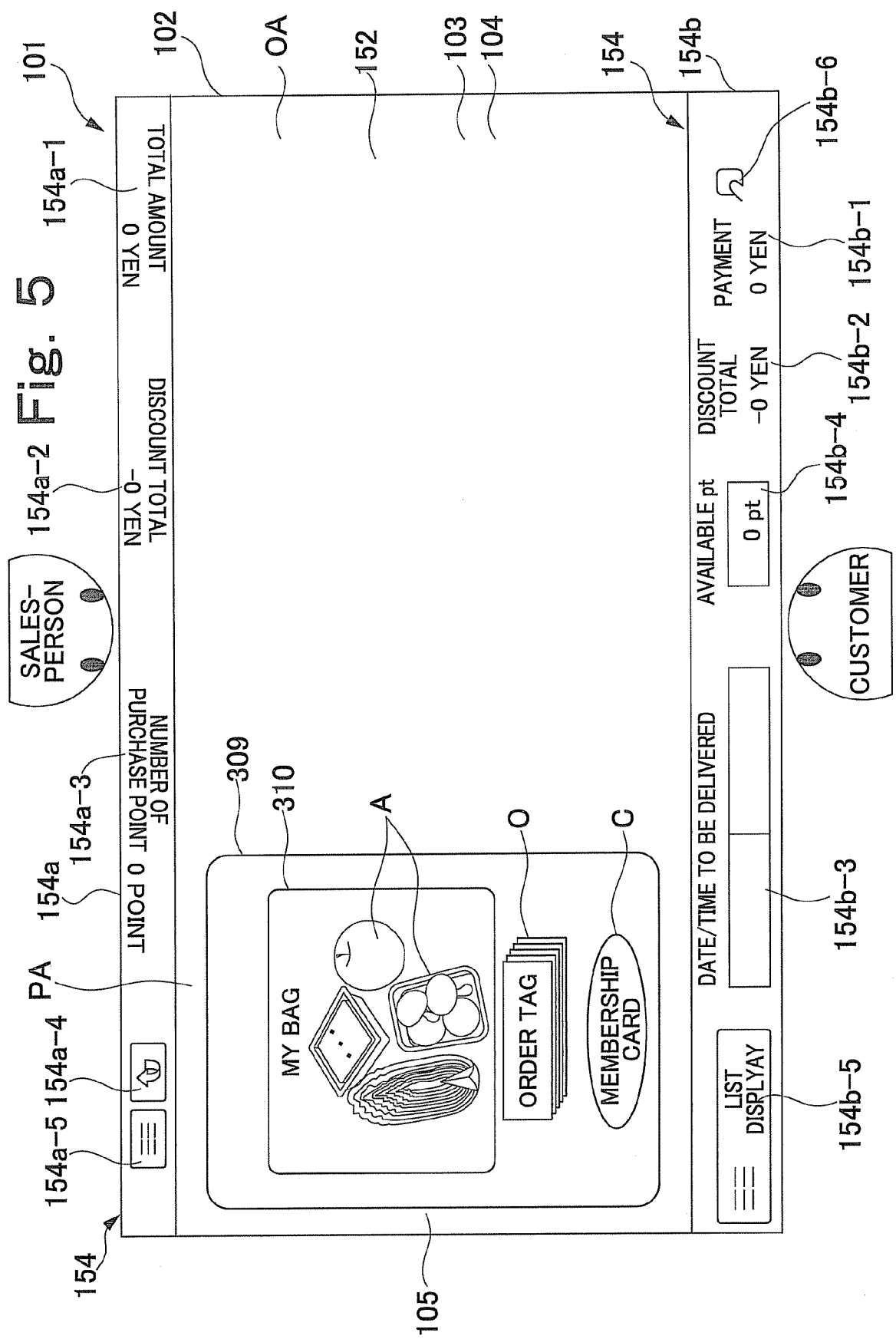
FIG. 5 is a plan view of the POS terminal (merchandise sales data processing apparatus) showing the moment at which a shopping basket with commodities or the like stored therein is mounted to a commodity placement area.

FIG. 5 is a plan view of the POS terminal 101 showing the moment at which a shopping basket 309 having stored articles A and the like therein is placed in the commodity placement area 105. The customer takes actual articles A to be purchased from the commodity shelves 308 installed in the store 301 or order tags O corresponding to the articles and holds or stores the same in the shopping basket 309. At this time, as one example, my back 310 brought by the customer is stored in the shopping basket 309 and the actual articles A are stored in my bag 310. On the other hand, the order tags O are stored in their corresponding storage area other than the my bag 310 of the shopping basket 309. Thus, the customer can leave quickly with my bag 310 after the membership card C has been recovered from the shopping basket 309 after the completion of settlement. The store side can pass the order tags O left in the shopping basket 309 on to the delivery. A smooth checkout can be realized in this way.

Figure 6A:
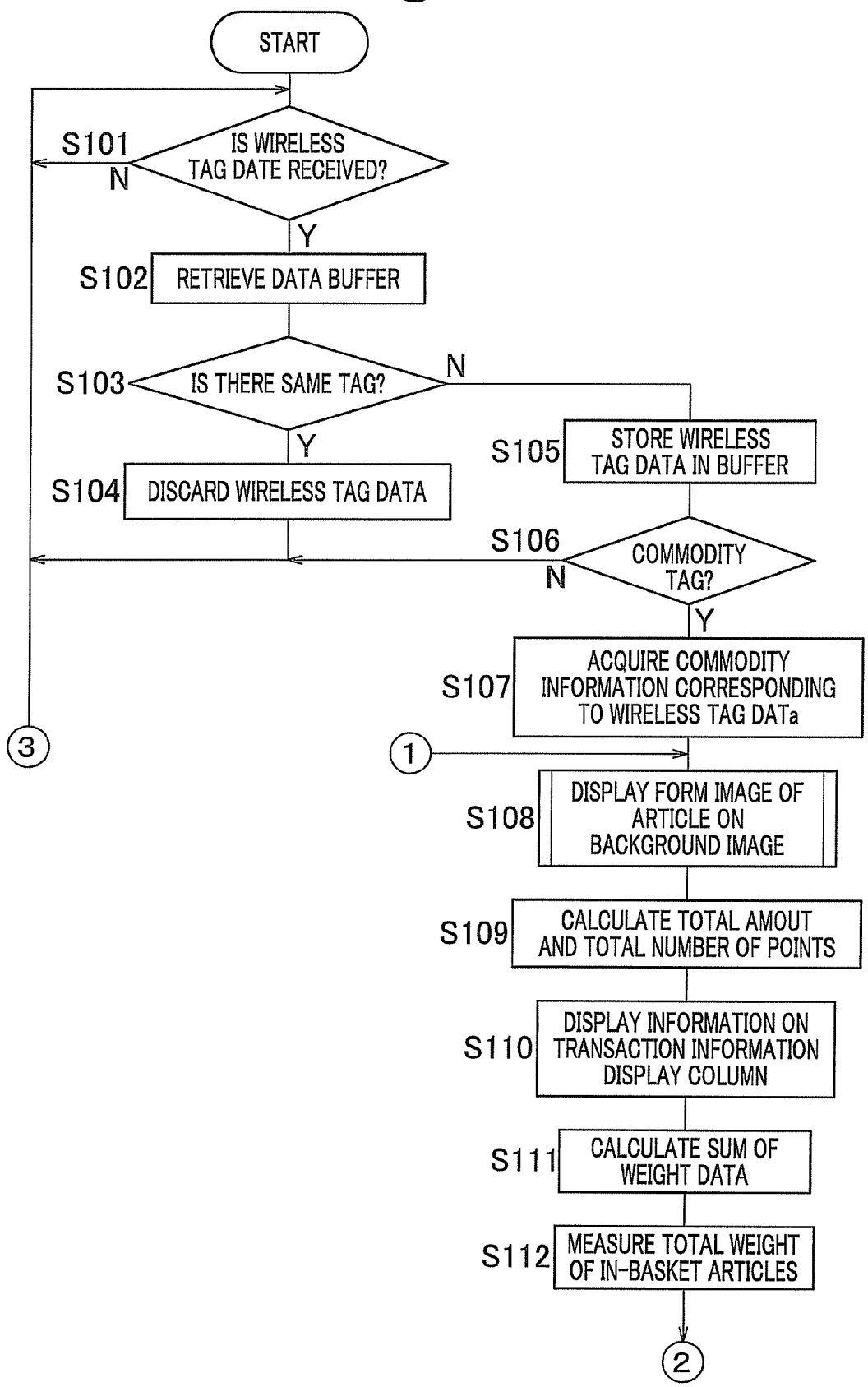
FIG. 6(A) is a flowchart showing a part of the flow of overall processing.

FIGS. 6(A) and (B) is a flowchart showing the flow of overall processing. The processing shown in the flowchart is executed by the CPU 202 in accordance with the computer program 209 installed in the HDD 206 and whose all or part has been copied to the RAM 204.

When the shopping basket 309 is placed in the commodity placement area 105 shown in FIG. 5, the wireless communication unit 106 executes short-range wireless communications between the articles A or order tags O accommodated in the shopping basket 309 and the membership card C attached to the shopping basket 309 and acquires stored data from wireless tags attached to the articles A, order tags O and membership card C. The wireless communication unit 106 transmits the acquired stored data of wireless tags to the control unit 201 through the system bus 207. Thus, the CPU 202 makes a decision as to the reception of the wireless tag data (Y in Step S101).

When the reception of the wireless tag data is determined (Y in Step S101), the CPU 202 retrieves a data buffer lying in the RAM 204 (Step S102) and makes a decision as to the presence or absence of the same wireless tag data (Step S103). When the same wireless tag data is stored in the data buffer as a result of the decision (Y in Step S103), the CPU 202 discards the wireless tag data judged to be received in Step S101 and returns to the decision process of Step S101 (Step S104). On the other hand, when the same wireless tag data is not stored in the data buffer as a result of the decision in Step S103 (N in Step S103), the wireless tag data judged to be received in Step S101 is stored in the data buffer (Step S105). At this time, the wireless tag data stored in the data buffer is data of a wireless tag attached to each article A or order tag O, data of a wireless tag incorporated in a membership card C or data of other wireless tags.

The CPU 202 determines in Step S106 following the above step whether the wireless tag data stored in the data buffer in Step S105 is data of a wireless tag attached to each article A or order tag O. When the answer is found to be negative as a result of its decision (N in Step S106), the CPU 202 returns to the processing of Step S101. On the other hand, when the answer is found to be affirmative as a result of its decision (Y in Step S106), the CPU 202 executes a retrieval process that the commodity database 210 is retrieved to acquire the corresponding commodity information (Step S107). Namely, the CPU 202 retrieves the commodity database 210 with a commodity code contained in the stored data of the wireless tag attached to each article A or order tag O being taken as a retrieval key, acquires a unit price thereof from the PLU area 210a-1 in the commodity data file 210a, acquires the weight thereof from the commodity weight database 210b and acquires image data from the commodity image database 210c.

As to such a retrieval process, various embodiments can be implemented in addition. For example, all or part of the commodity database 210 is stored and held in the store server 401 or an external memory or storage device (not shown) accessible by the store server 401. The POS terminal 101 may acquire required data from the store server 401 through the local area network 402. As a further embodiment, all or part of a unit price, weight and image data is stored and held in a wireless tag per se, and the POS terminal 101 may obtain required data from the wireless tag itself. Such various variations eventually depend on how the unit price, weight and image data of each article specified or identified by each article A or order tag O with a wireless tag attached thereto to be read by the wireless communication unit 106 are stored.

In Step S108 following the above step, the CPU 202 displays figure images 153 of the articles based on the image data contained in the commodity information acquired in Step S107 on the background image 152 displayed on the display 103. Namely, the control unit 201 develops and displays the article's figure images 153 acquired from the commodity image database 210c, for example, based on the stored data acquired by the wireless communication unit 106 on the background image 152 under its display control. Thus, the corresponding transaction screen 151 is displayed. The transaction screen 151 displayed in accordance with Step S108 is displayed toward the salesperson corresponding to the cashier. This is because the salesperson first needs to confirm the identity between the articles specified by the actual articles A and order tags O stored in the shopping basket 309 and the articles developed to the display 103 as the transaction screen 1251.

Figure 7:
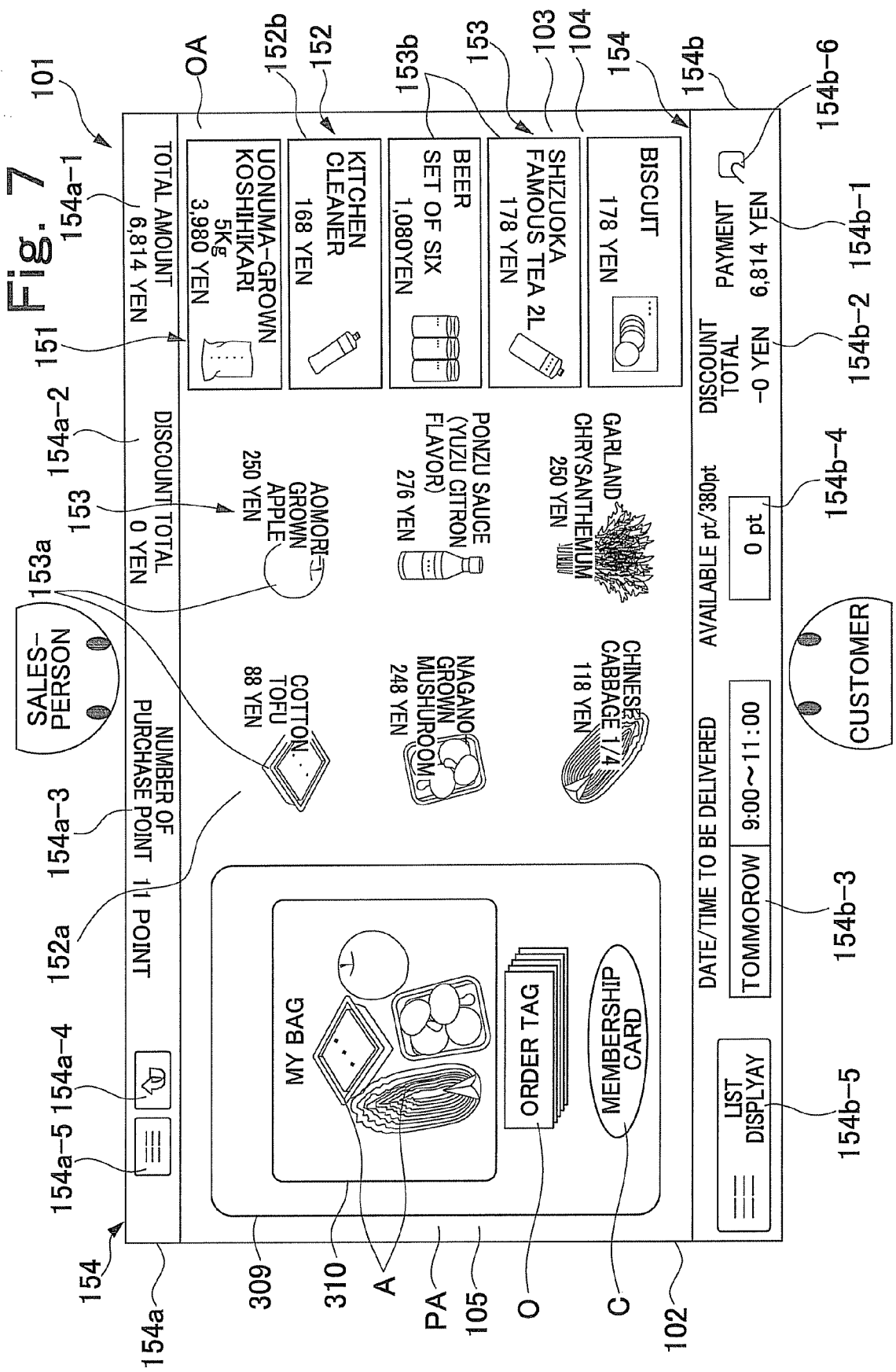
FIG. 7 is a plan view of the POS terminal (merchandise sales data processing apparatus) showing a state in which commodity information read from the commodities or the like stored in the shopping basket are displayed on the display toward the salesperson side.

FIG. 7 is a typical diagram showing a state in which commodity information read from articles A or the like stored in the shopping basket 309 are displayed on the display 103 toward the salesperson side. As shown in FIG. 7, the article's figure images 153 based on the image data contained in the commodity information obtained in Step S107 are displayed on the background image 152 displayed on the display 103. The figure images 153 of the articles illustrated in FIG. 7 are represented with the names of the articles and their unit prices being added to their corresponding three-dimensional illustrations of articles. As one example, the illustrations, names and unit prices contained in the figure images 153 are prepared in advance as the image data stored in the commodity image database 210c. As another example, only image data of illustrations are stored in the commodity image database 210c, the names and unit prices of their corresponding articles are stored in the PLU area 210a-1 in the commodity data file 210a, for example. These illustrations and the names and unit prices may be combined to generate the corresponding figure images 153. In this case, only text data about the names and unit prices are stored in the PLU area 210a-1, and the text data may be converted into image data each time the figure images 153 are displayed, followed by being displayed.

As shown in FIG. 7, the background image 152 has a take-out commodity display area 152a at its central part and a delivery commodity display area 152b placed in an area that approaches one side. One group (figure images 153a) of the figure images 153 is represented as outward-appearance forms per se of articles two-dimensionally or three-dimensionally developed in the take-out commodity display area 152a as take-out articles. Another group (images 153b) of the figure images 153 is represented in tile form in the delivery commodity display area 152n as delivery articles. The tile forms are represented in forms in which images each indicative of the outward appearance of the article in each tile are two-dimensionally or three-dimensionally developed. The figure images 153a displayed in the take-out commodity display area 152a are of images displayed based on the commodity information read from their corresponding wireless tags attached to the actual articles A. The figure images 153b displayed in the delivery commodity display area 152b are of images displayed based on commodity information read from wireless tags attached to order tags O. Such a distinction is easily made possible by causing the wireless tags attached to the actual articles A and the wireless tags attached to the order tags O to include identification codes capable of distinguishing between the actual articles A and the order tags O. Namely, when the identification codes indicative of the wireless tags attached to the actual articles A are received in the CPU 202, the CPU 202 acquires display frames capable of displaying the figure images 153a from the image library 211 and displays image data of the articles acquired from the commodity database 210c in combination with the display frames. When the identification codes indicative of the wireless tags attached to the order tags O are received in the CPU 202, the CPU 202 acquires display frames capable of displaying the figure images 153b and displays image data of the articles acquired from the commodity image database 210c in combination with the display frames.

Thus, according to the present embodiment, the figure images 153 of the articles acquired from the commodity image database 210c (refer to FIG. 3) based on the stored data acquired by the wireless communication unit 106 are developed in the background image 152 displayed on the display 103 in different expressive forms corresponding to the distinction between the take-out articles and delivery articles recorded in the stored data. In this case, the different expressive forms are realized by causing the forms of the figure images 153 to differ between the take-out articles and the delivery articles. Namely, the take-out articles and the delivery articles are distinguished from one another by the figure images 153a indicated by the outward-appearance forms per se of the two-dimensionally or three-dimensionally developed articles, which are indicative of the take-out articles, and the figure images 153b indicated by the forms in which the images each indicative of the outward appearance of each article are two-dimensionally or three-dimensionally developed in the tiles representing the delivery articles. The different expressive forms are implemented even by causing the display areas of the figure images to differ between the take-out articles and the delivery articles. Namely, the take-out articles are displayed in the take-out commodity display area 152a and the delivery articles are displayed in the delivery article display area 152b, whereby the take-out articles and the delivery articles are distinguished from one another.

Figure 6B:
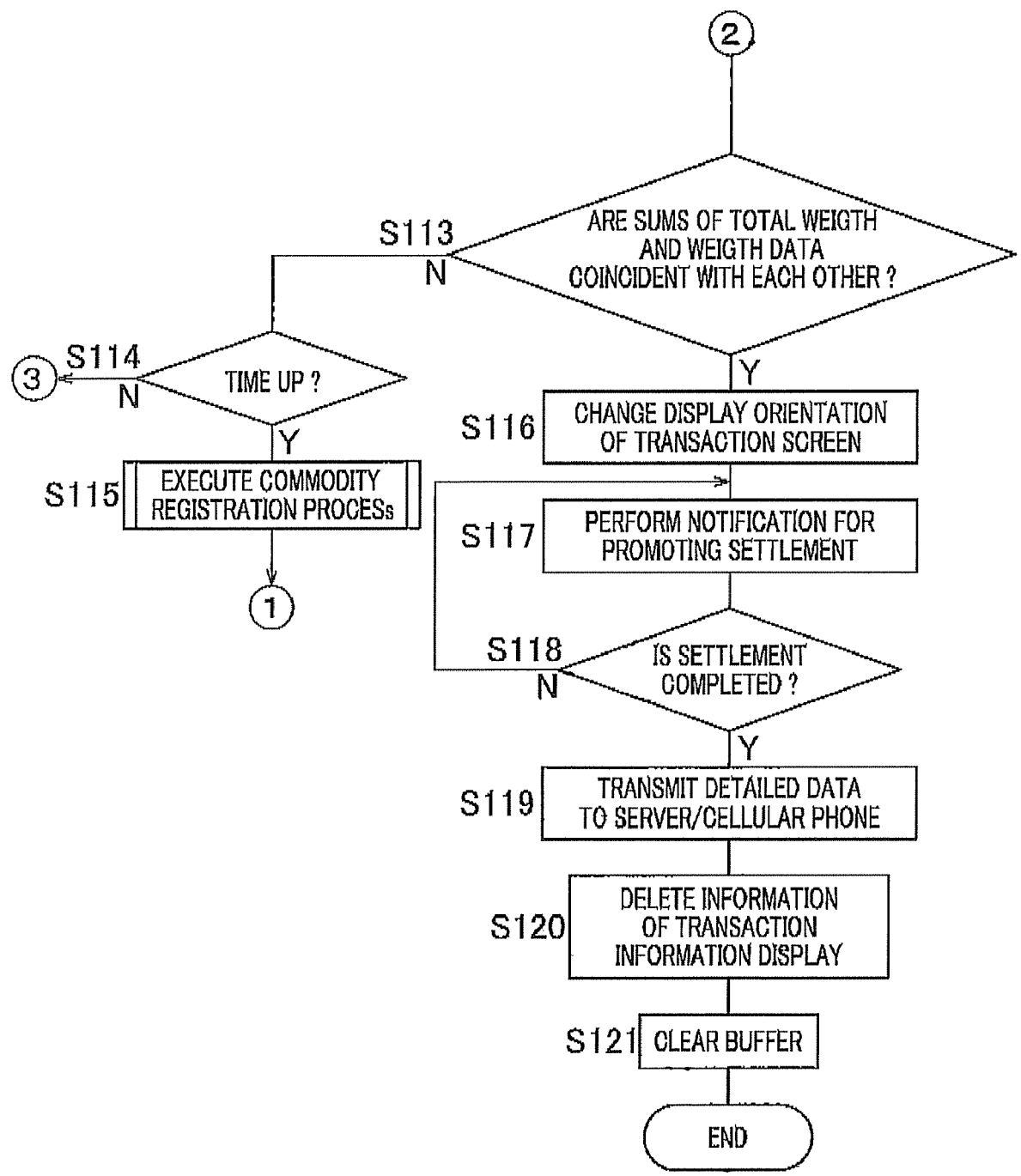
FIG. 6(B) is a flowchart showing another part of the flow of overall processing.

In the processing of Step S108 in the flowchart shown in FIG. 6, processing about a set discount is also executed.

Return to the description of the flowchart shown in FIG. 6. After the transaction screen 15 is represented and displayed on the display 103 (refer to Step S108), the CPU 202 calculates the total amount of sales articles and the total number of points thereof (Step S109). The calculation of the total amount is executed based on the unit prices acquired fro the PLU area 210a-1 in the commodity data file 210a contained in the commodity database 210. The calculation of the total number of points is executed based on the number of times in which the decision made as the wireless tags attached to the articles A or order tags O in Step S106 is carried out.

The CPU 202 displays transaction information or the like obtained by the processing of Step S109 on the transaction information display column 154 displayed on the display 103 (Step S110). Namely, the total amount calculated in Step S109 is displayed on its corresponding total amount column 154a-1 in the salesperson transaction information display column 154a directed to the salesperson corresponding to the cashier. The sum of discount amounts about the individual articles acquired from the PLU area 210a-1 in the commodity data file 210a in Step S107 is displayed on its corresponding discount amount column 154a-2. The total number of points calculated in Step S109 is displayed on its corresponding number-of-purchase points column 154a-3. The total amount calculated in Step S109 is displayed on the payment amount column 154b-1 in the customer transaction information display column 154b directed to the customer side. The sum of the discount amounts about the individual articles acquired from the PLU area 210a-1 in the commodity data file 210a in Step S107 is displayed on the discount amount column 154b-2. A default value about the deliver date/time acquired from the wireless tag built in the membership card C, which has been stored in the corresponding buffer of the RAM 204 in Step S105, is displayed on the corresponding delivery date/time column 154b-3. Further, the number of points acquired from the corresponding wireless tag built in the membership card C, which has been in the buffer of the RAM 204 in Step S105, is displayed on the corresponding point designation column 154b-4.

Thereafter, the CPU 202 executes a weight check process (Steps S111 through S113). In the weight check process, the sum of weight values acquired by the retrieval process of Step S107 is first calculated as a total weight value (Step S111). A measured or counted value measured or weighted by the scale unit 108 and outputted therefrom is acquired (Step S112). In this condition, the total weight value calculated in Step S111 and the measured value from the scale unit 108 acquired in Step S112 are compared to determine the identity therebetween (Step S113).

Here, whether the total weight value calculated in Step S111 and the measured value from the scale unit 108 acquired in Step S112 have the identity is made by, as one example, determining whether the measured value falls between lower and upper limit values of each weight acquired by the retrieval process. In this case, the weight check according to the present embodiment is not directed to a single weight check for each individual article but to a weight check for the total value of the weights of all articles A and order tags O per se stored in the shopping basket 309 placed in the commodity placement area 105. Thus, when the identity between the measured value and the weight value is determined, the total value of the lower limit values of all articles, corresponding to the weight values acquired by the retrieval process, and the total value of the upper limit values thereof corresponding to the weight values constitute or form an allowable range. It is determined whether the measured value falls within the allowable range. However, the allowable range acquired by such a method is a mere one example upon its implementation and may be narrowed by, for example, multiplication of the value thereof by a given coefficient or broadened in reverse. As another example, only the values of the weights obtained by the retrieval process is used without acquiring the lower and upper limit values by the retrieval process or without using their values even if they are acquired. They are added together to calculate the total value thereof and a given allowable range for the total value is set, whereby it may be set as a total weight value.

When the identity between the calculated total weight value and the measured value acquired from the scale unit 108 is not determined in Step S113 (N in Step S113), the CPU 202 waits for a time-up for a predetermined time (Step S114). The predetermined time set herein is a sufficient time at which the wireless communication unit 106 can acquire each commodity code. Namely, the process of Step S114 is provided to cause the CPU 202 to wait until the wireless communication unit 106 completes the acquisition of each commodity code and cause the CPU 202 to proceed to Step S115 to be described later where the time at which the wireless communication unit 106 will no longer acquire each commodity code has elapsed.

Therefore, when no time-up occurs (N in Step S114), the CPU 202 returns to the process of Step S101 and executes the processes of Steps S101 through S113. This is because in this case, the articles A or the like at which no commodity information are acquired in Step S107 should be left in the shopping basket 309. On the other hand, when the time-up is done (Y in Step S114), the CPU 202 executes a commodity registration process to he described in detail later (Step S115). The commodity registration process in this case needs to register commodity codes for articles whose commodity codes cannot be acquired by the wireless communication unit 106, e.g., articles with no commodity codes attached thereto, as purchase articles or commodities. After the commodity registration process of Step S115, the CPU 202 returns to the process of Step S108.

When the CPU 202 determines the identity between the calculated total weight value and the measured value acquired from the scale unit 108 in Step S113 (Y in Step S113), the CPU 202 switches the directional orientation of display of the transaction screen 151 displayed on the display 103 to the customer side (Step S116).

Figure 8:
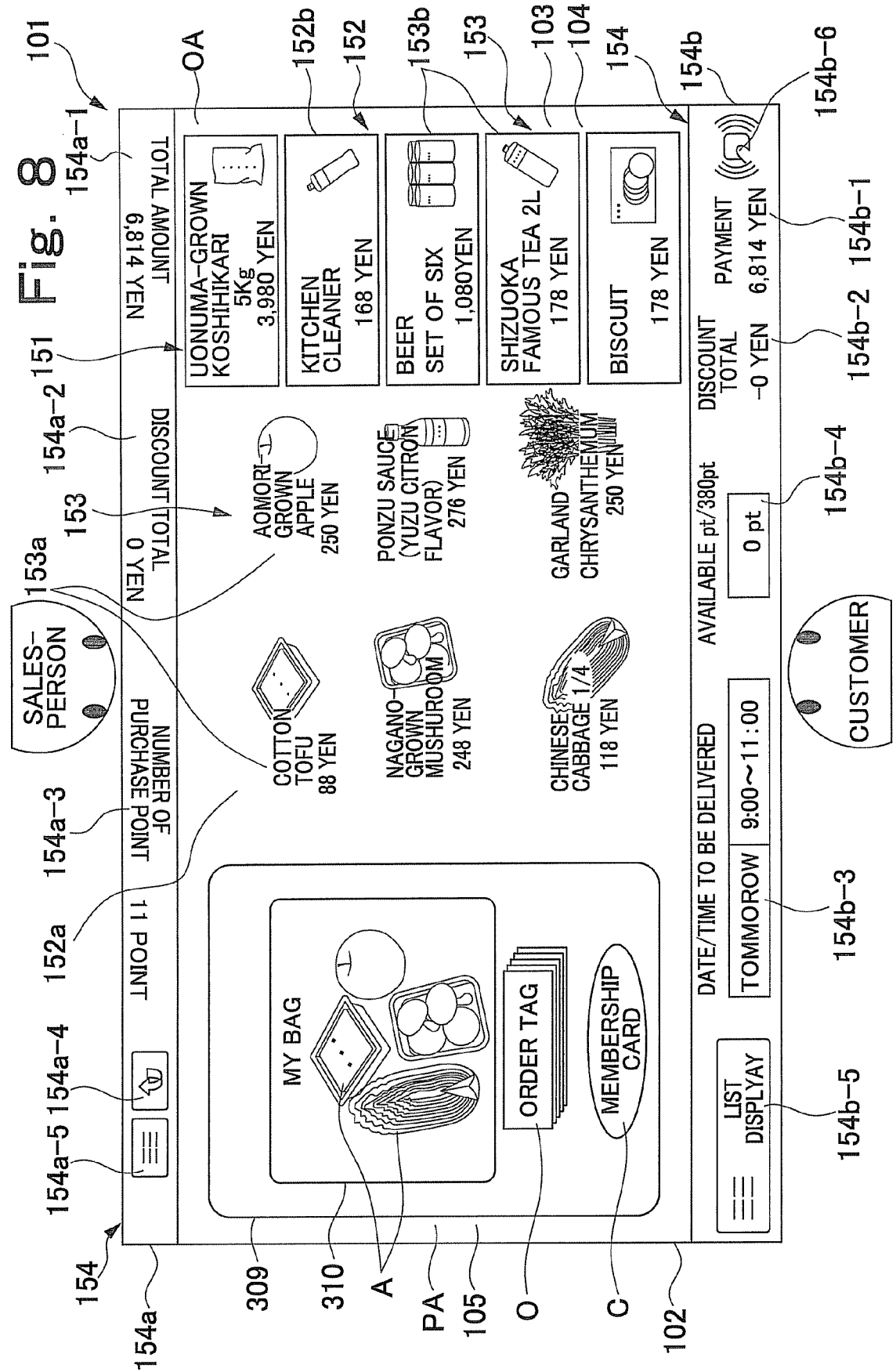
FIG. 8 is a plan view of the POS terminal (merchandise sales data processing apparatus) showing a state in which the commodity information shown in FIG. 7 are displayed in reverse form toward the customer side.

FIG. 8 is a plan view of the POS terminal 101 showing a state in which the commodity information shown in FIG. 7 are displayed in reverse form toward the customer side. As is apparent by a comparison with the display state shown in FIG. 7, the orientation of display of the transaction screen 151 displayed on the display 103 has been switched in the display state shown in FIG. 8. Thus, it is possible to easily confirm the articles displayed on the display 103 as the transaction screen 151 on the customer side. In addition, the display position of the transaction screen 151 displayed on the display 103 is taken as the position where it does not change in the vicinity of reversal of its display orientation. Thus, the articles developed on the display 103 as the transaction screen 151 can be further confirmed easily.

Description returns to the flowchart shown in FIG. 6. The CPU 202 displays the transaction screen 151 toward the customer (Step S116) and thereafter displays a dialogue for promoting the settlement on the display 103 (Step S117). The CPU 202 waits for the determination of completion of the settlement (Step S118).

The customer having recognized the dialogue for promoting the settlement is urged to perform a settlement operation. As one example, the customer makes settlement through a medium having incorporated a self-owned non-contact IC chip that enables settlement therein, e.g., a cellular phone. In this case, the cellular phone or the like is held up in a position above the hold-over position display 154$b$-6 located in the most right hand of the transaction information display column 154$b$ directed to the customer side. Thus, as one example, the settlement by electronic money stored in the non-contact IC chip built in the cellular phone is enabled. As another example, debit settlement based on the information stored in the non-contact IC chip built in the cellular phone is enabled.

When the completion of settlement is determined (Y in Step S118), the CPU 202 transmits detail data to the store server 401 and the cellular phone or the like used in the settlement by the customer (Step S119). The transmission of the detail data to the store server 401 is carried out by wired data transmission done via the local area network 402 from the communication interface 212. The transmission of detail data to the cellular phone or the like held by the customer is executed by short-range wireless communications by the reader/writer 107.

Thereafter, the CPU 202 deletes the information displayed on the transaction information display column 154 (Step S120) and clears the buffer of the RAM 204 (Step S121), followed by leading to the end of processing for one transaction.

According to the present embodiment as described above, the background image 152 is displayed on the display 103. When the articles A or the like are placed in the commodity placement area 105, the figure images 153 of the articles are developed and displayed on the background image 152 in the different expressive forms corresponding to the distinction between the take-out articles and the delivery articles. Thus, even where such a checkout system that the wireless tags respectively attached to the plural articles A or the like brought to the checkout counter 102 are collectively read out and the information about the individual articles or commodities are displayed on the display 103 at a time is adopted, it is possible to viscerally check for the individual articles brought to the checkout counter and the articles displayed on the display 103. It is also possible to viscerally check whether the individual articles brought to the checkout counter are of either take-out articles or delivery articles. Accordingly, the work of checking therefor can be facilitated.

According to the present embodiment as well, the display 103 is placed upwards in the top-plate surface of the checkout counter 102. Thus, the checkout process can be put forward while the salesperson being the cashier and the customer are confirming the same screen. Since the two transaction information display column 154 (transaction information display columns 154$a$ and 154$b$) are provided for the salesperson and the customer even in this case, the confirmation of transaction information becomes easy for both the salesperson and the customer. Further, since the directional orientation of display of the transaction screen 151 is reverse-displayed toward the salesperson and the customer, it becomes easy for both the salesperson and the customer to confirm each article to be purchased. Since the display orientation of the transaction screen 151 is firstly set to the salesperson side and set to the customer side where the weight check process is caused to pass (Y in Step S113 of FIG. 6), information about the purchased articles can be timely provided for the salesperson and the customer.

In the POS terminal 101 according to the present embodiment, however, the display orientation of the transaction screen 151 can be reverse-displayed according to the object operation on the touch panel 104. Alternatively, the purchased articles can be displayed in list form. Both the salesperson and the customer touch-operate the touch panel 104 as needed, thereby making it possible to change the state displayed on the display 103 and input specific instructions.

Figure 9A:
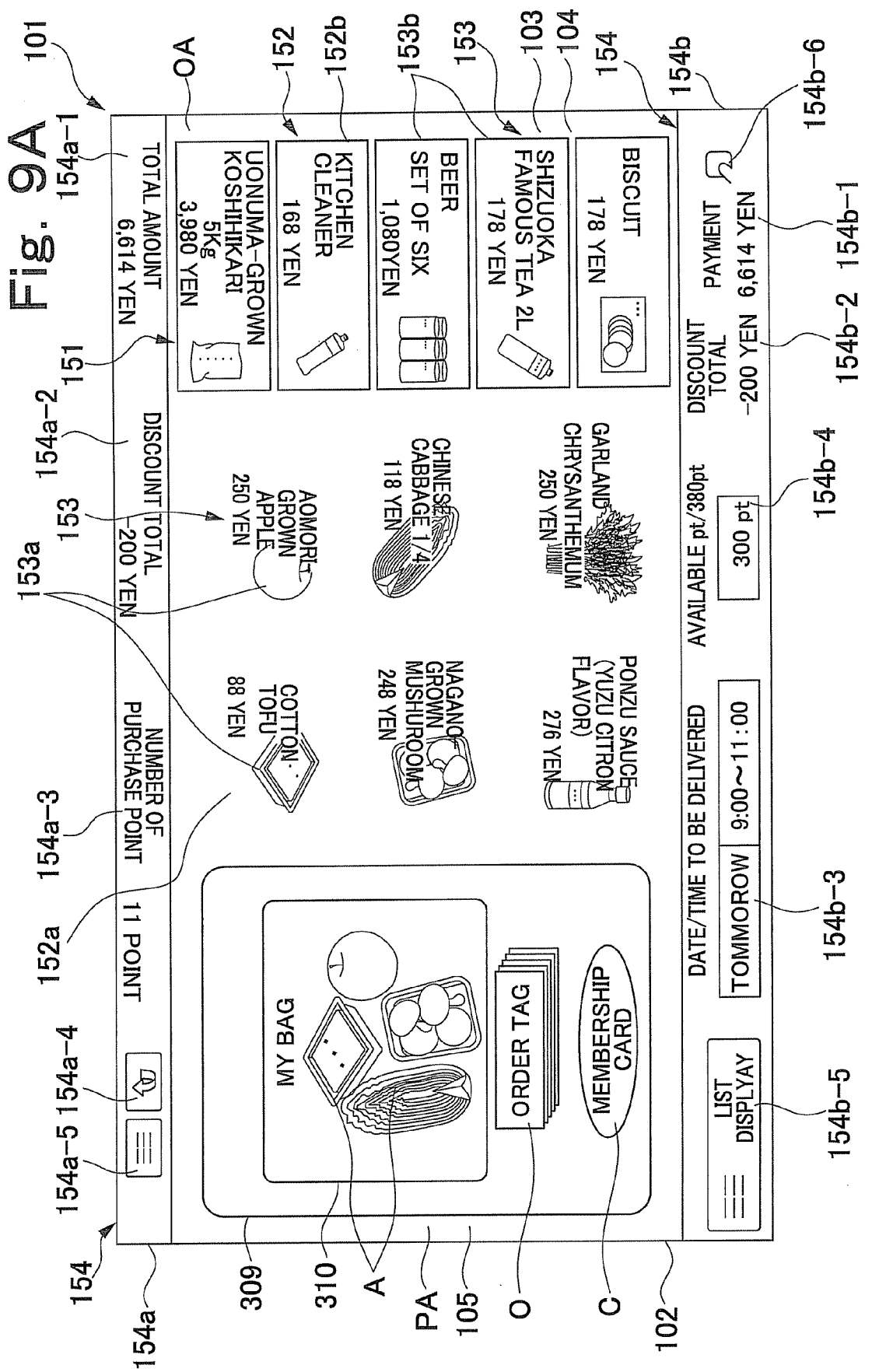
FIG. 9(A) is a plan view of the POS terminal (merchandise sales data processing apparatus) showing a state in which a transaction screen is directed to the salesperson side for describing a reverse representation of display contents by manual operation.
Figure 9B:
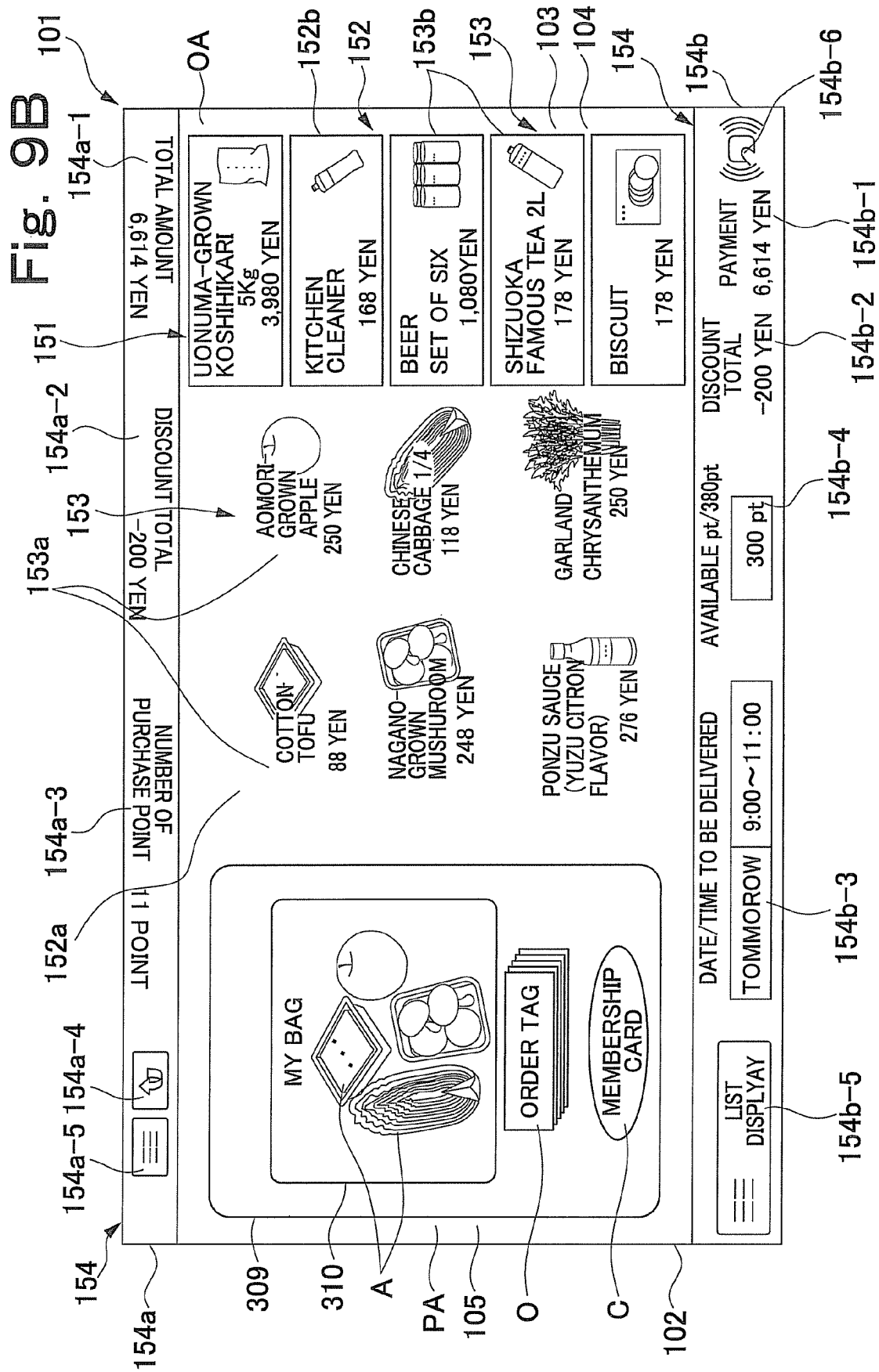
FIG. 9(B) is a plan view of the POS terminal (merchandise sales data processing apparatus) showing a state in which the transaction screen is directed to the customer side for describing a reverse representation of display contents by manual operation.

FIG. 9 is a plan view of the POS terminal 101 for describing a reverse representation of display contents by a manual operation. A transaction screen 151 displayed on the display 103 shown in FIG. 9(A) is directed to the salesperson side. A transaction screen 151 displayed on the display 103 shown in FIG. 9(B) is directed to the customer side.

When the reverse display instruction button 154a-4 in the transaction information display column 154a displayed on the salesperson side is touch-designated, the CPU 202 reverses the display orientation of the transaction screen 151 displayed on the display 103 as shown in FIGS. 9(A) and (B).

According to the embodiments of the present invention, the figure images of the articles acquired from the memory unit based on the stored data acquired by the wireless communication unit where the articles are placed in the commodity placement area, are displayed on the display. Therefore, the individual articles brought to the checkout counter and the articles displayed on the display can be checked viscerally even where such a checkout system that the wireless tags attached to the plural articles brought to the checkout counter are collectively read out and the commodity information about the individual articles are displayed at a time, is adopted, thus making it possible to facilitate their checking work. Since the commodity registration screen that enables the choice of each article by the operation at the touch panel is displayed, it is possible to achieve the facilitation of the process for registering the articles at which the stored data of the wireless tags thereof could not be read from the wireless tags.

Obviously, numerous modifications and variations of the present invention are possible in light of the above teachings. It is therefore to be understood that within the scope of the appended claims, the invention may be practiced otherwise than as specifically described herein.

What is claimed is:

1. A merchandise sales data processing apparatus, comprising:
   a checkout counter which has a commodity placement area;
   a display placed upwards in a top-plate surface of the checkout counter;
   a touch panel placed in the display;
   a wireless communication unit that executes data communications with wireless tags respectively attached to articles and thereby acquires stored data from the wireless tags;
   a control unit that executes
      display control to display figure images of the articles acquired from a memory unit in X-axis and Y-axis directions in a display area of the display based on the stored data acquired by the wireless communication unit, each of the figure images being displayed toward a salesperson,
      a process for displaying on the display, a commodity registration screen that enables a selection of each article by the operation at the touch panel, and
      a process for executing a merchandise sales data process containing a settlement process, based on commodity codes contained in the stored data acquired by the wireless communication unit and the commodity codes of the articles each selected by the operation at the touch panel,
   wherein the control unit displays the figure images arranged in the X-axis and Y-axis directions in reverse direction toward a customer without position change in accordance with a predetermined operation on the touch panel.

2. The merchandise sales data processing apparatus according to claim 1, further comprising a scale unit for measuring the weight of each article placed in the commodity placement area,
   wherein the control unit executes:
      a process for performing access to a memory unit storing a commodity weight database that stores weight data of articles in association with commodity codes thereby to acquire weight data corresponding to the commodity codes contained in the stored data acquired by the wireless communication unit and determining coincidence/non-coincidence between a total decision weight of all articles placed in the commodity placement area, determined based on the acquired weight data, and each weight measured by the scale unit; and
      a process for displaying a commodity registration screen on the display where the non-coincidence between the decision weight and the measured weight is determined.

3. The merchandise sales data processing apparatus according to claim 1,
   wherein the control unit displays transaction information on the display toward the salesperson and the customer, respectively, with the checkout counter interposed therebetween.

4. The merchandise sales data processing apparatus according to claim 1,
   wherein the control unit reverse-displays a display orientation of a figure image of each article displayed on the display toward the salesperson or the customer in accordance with a predetermined operation on the touch panel.

5. The merchandise sales data processing apparatus according to claim 4, wherein the control unit displays the figure image toward the salesperson and, after the salesperson checks the figure image, displays the figure image in reverse direction toward the customer without position change.

6. A merchandise sales data processing method applied to a merchandise sales data processing apparatus including a checkout counter provided with a commodity placement area, a display placed upwards in a top-plate surface of the checkout counter, and a touch panel placed in the display, the merchandise sales data processing method comprising:
   executing data communications with wireless tags respectively attached to articles and thereby acquiring stored data from the wireless tags;
   displaying figure images of the articles acquired from a memory unit in X-axis and Y-axis directions in a display area of the display based on the stored data acquired from the wireless tags, each of the figure images being displayed toward a salesperson;
   displaying on the display, a commodity registration screen that enables a selection of each article by the operation at the touch panel; and
   executing a merchandise sales data process containing a settlement process, based on commodity codes contained in the stored data acquired by the wireless communication unit and the commodity codes of the articles each selected by the operation at the touch panel,
   wherein the figure images arranged in the X-axis and Y-axis directions are displayed in reverse direction toward a customer without position change in accordance with a predetermined operation on the touch panel.

* * * * *